Aug. 25, 1931.   W. L. PHIFFER   1,820,824
OUTLET BOX
Filed April 25, 1930

INVENTOR.
Willard L. Phiffer
BY Lancaster, Allwine and Rommel
ATTORNEYS.

Patented Aug. 25, 1931

1,820,824

UNITED STATES PATENT OFFICE

WILLARD L. PHIFFER, OF HORTON, KANSAS

OUTLET BOX

Application filed April 25, 1930. Serial No. 447,335.

The present invention relates to electric switches and more particularly to an outlet box for flush switches and receptacles.

In the installation of outlet boxes for mounting of flush switches and receptacles, the box is intended to be installed so that the open side will substantially align with the plaster line or surface of the wall so as to bring the switch or receptacle mounted therein flush with the surface of the wall. In actual practice, this result is seldom obtained and in most cases the box sets back of the plaster line or wall surface to such an extent that it is almost impossible to mount the switch or receptacle so as to extend flush with the plaster line. With a box so sunk back of the plaster line, the switch or receptacle must be raised flush by means of washers, tubing or other expedients and which results in a great loss of time. As is now general practice, the manufacturer merely supplies four washers with each switch or receptacle having two mounting screws. These four washers rarely ever provide sufficient building up to bring the switch or receptacle flush with the wall surface.

It is therefore the primary object of the present invention to provide an improved switch or receptacle box which will dispense with the necessity of "building up" for disposing the switch or receptacle flush with the wall surface and result in a great saving of labor in the installation of such devices.

A further object of the invention is to provide an improved outlet box provided with adjustable supports for mounting of switches or receptacles flush with the plaster line or wall surface regardless of the position the box is set back in the wall.

A further object of the invention is to provide an outlet box having a construction permitting flush aligning of switches or receptacles with the wall surface without requiring the use of any washers or other expedients.

A further object of the invention is to provide an outlet box of this type which may be manufactured at little or no additional costs over the present types of sectional outlet boxes.

Other objects and advantages of the invention will be apparent during the course of the following detailed description, taken in connection with the accompanying drawings, forming a part of this specification and in which drawings.

Figure 1:
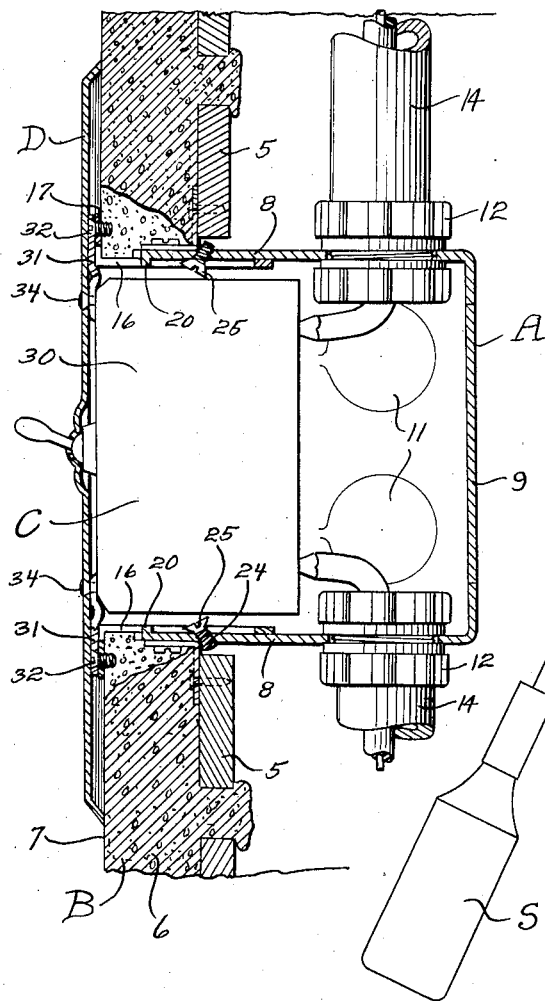
Figure 1 is a sectional view thru the improved outlet box shown mounted in a section of wall and showing by way of example a toggle flush switch mounted in the box.

Referring to the drawings in detail, and wherein similar reference characters designate corresponding parts thruout the several views, the letter A designates the improved outlet box shown mounted in the wall B and adapted to receive a flush switch C in such manner as to dispose the switch in proper relation to the wall surface for properly receiving the face or flush plate D.

In the example shown, the receptacle has been shown by way of example mounted in a plastered wall construction embodying the lathing 5 and plaster 6. In new construction work, the electrical installation is partially completed, as to the mounting of the receptacles and connection of the conduits thereto, prior to plastering. Owing to the variations in thickness of plastered walls, it is practically impossible to mount the outlet boxes so that the open ends are flush with the plaster line or wall surface designated as at 7. Outlet boxes as now in general use for mounting of flush switches and receptacles are provided at their open ends with outwardly bent mounting lugs provided with threaded openings for receiving set screws for attaching the switch or receptacle to the outlet box. For bringing the switch out flush with the wall surface, a number of washers are disposed about the set screws between the mounting ears of the switch and mounting lugs of the outlet box. In a number of cases the outlet box is so far back of the wall surface as to require the use of many washers for properly setting out the switch and since only four washers are furnished with each flush switch, considerable time is lost by the workmen in locating and placing a large number of washers or other building up expedients. The improved outlet box as herein disclosed will permit proper aligning of flush switches or receptacles with the plaster line or wall surface without the use of any washers or any other means of building up for proper mounting of the switch or receptacle.

While in the example shown the outlet box has been shown having a flush switch mounted therein it will readily be apparent that flush receptacles of various types may also be mounted in the box.

The box A is of metal construction and in the example shown is of sectional formation embodying the parallel end walls 8 integral with the bottom wall 9, and removable side walls 10. The end, side and bottom walls may be provided with the usual knock-out plugs 11 whereby the conduit 14 may be connected to the box by means of the bushings 12. Each end wall 10 is provided adjacent its outer edge with a reversible mounting ear 13 of the conventional C type for supporting the box and in the example shown these mounting ears have been shown attached to the laths 5. These mounting ears 13 are for permitting a limited amount of adjustment to the box during mounting and prior to application of the wall finish or plaster 6. These mounting ears 13 will not permit ready adjustment of the outlet boxes subsequent to application of the wall finish with the result in the conventional type of outlet boxes, the switch or receptacle to be mounted in the box cannot be easily mounted flush with the wall surface.

With the improved type of outlet box herein shown, an adjustable supporting means is provided having a large degree of adjustment whereby the flush switch or receptacle may be properly mounted flush with the wall surface even tho the open end of the outlet box is set back a considerable distance from the wall surface. This adjustable supporting means embodies a pair of similarly formed adjustable supports 15 one of which is associated with each of the end walls 8 adjacent the outer edge thereof.

Figure 4:
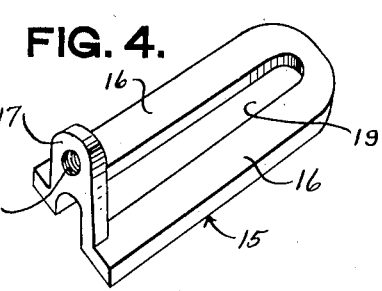
Figure 4 is an enlarged perspective view of one of the adjustable supports.

These adjustable supports 15 may be products of the same die stamping and each embodies a U-shaped body portion of substantially flat formation and providing a pair of parallel side arms 16. Connecting the outer ends of the side arms 16 and offset at a right angle thereto is a mounting lug 17 provided with a tapped opening 18. This mounting lug 17 has its outer surface flush with the outer ends of the side arms 16 and as will be observed in Figure 4 is of a width less than the width of the U-shaped body portion. The parallel side arms 16 form a longitudinal guideway 19 opening at the outer end of the support and closed at its inner end by the yoke portion connecting the inner ends of the side arms.

Bent inwardly from the outer edge of each end wall 8, preferably midway between the side walls 10, is a guide lug 20 of a length equal to the width of the guideway 19 provided in the supports 15. Beyond the ends of the guide lugs 20 the forward edges of the end walls 8 are cut away for a depth even with the outer surface of the guide lugs to form pockets or recesses 21 of a depth and length to receive the mounting lugs 17 whereby the outer surfaces of the lugs may be disposed flush with the outer end edges of the end walls 8. This recessing of the mounting lugs 17 into the outer edge of the outlet box permits mounting of the open end of the box flush with the wall surface when such is permissible in some classes of installation.

Provided in each end wall 8 in direct alignment inwardly of the guide lugs 20 is a threaded opening 24 set at an angle to the plane of the flat end walls. These angularly disposed threaded openings 24 are disposed with their axes converging toward the open end of the box and at such an angle that the converging point of their axes will be beyond the open end of the outlet box. Adapted to be threaded into each of the threaded openings 24 is a set screw 25 having a counter-sink head for clamping engagement with the side arms 16 of the supports 15. The diameter of the flat head set screws 25 is slightly greater than the width of the guideways 19 so that upon placing of the set screws the conical portion of the set screw heads will have binding engagement against the inner edges of the side arms 16.

Figure 2:
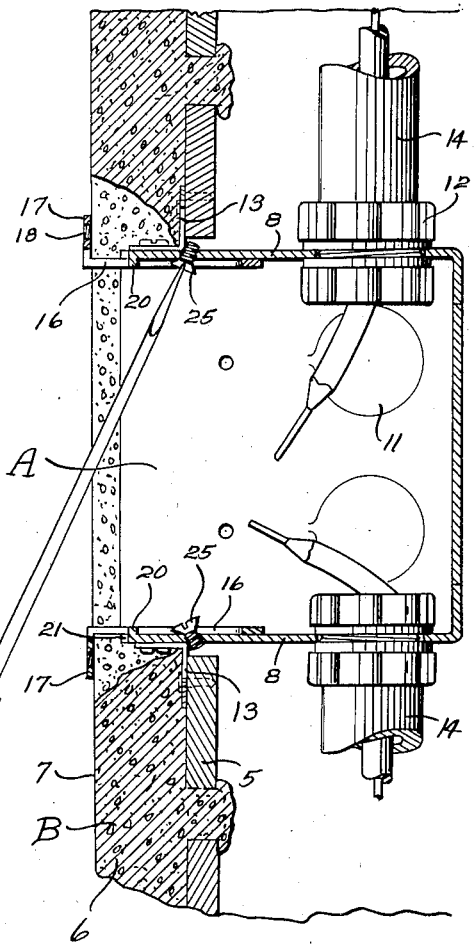
Figure 2 is a sectional view thru the box shown mounted and illustrating the manner in which the switch supports may be adjusted for flush mounting of the switch.

In Figure 2, has been illustrated the manner in which the set screws may be readily turned by means of a screw driver or the like designated at S inserted at an angle into the open end of the box. Since adjustment of the supports 15 is desirable after the wall finish has been applied the desirability of having the set screws arranged at an angle so as to permit ready and easy turning thereof and to properly dispose the mounting lugs 17 with respect to the wall surface will readily be seen.

Figure 3:
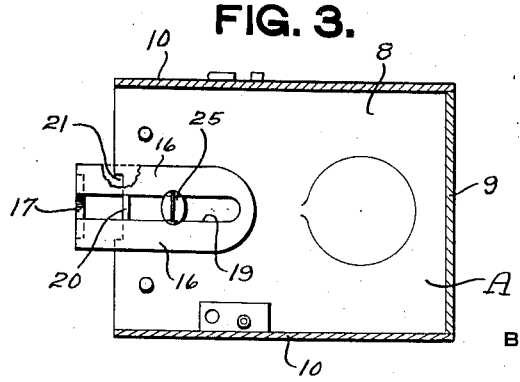
Figure 3 is a transverse section thru the outlet box.

By observing Figure 3 it will be seen that the guide lug 20 and the set screw 25 retain the support in a longitudinally adjustable position at the inner side of the box end wall with the outwardly offset mounting lug parallel to the outer edge of the end wall.

The flush switch C is of the usual construction and includes the body portion 30 provided at its outer side with the usual aligning lugs 31 for attachment of the switch to the mounting lugs 17. As in usual practice the aligning lugs 31 are apertured to receive mounting screws 32 adapted to be threaded into the tapped openings 18 provided in the mounting lugs 17. As in usual construction, the aligning lugs 31 are also provided with tapped openings for threaded reception of the plate attaching screws 34 whereby the flush plate D is secured in a concealing relation over the switch C with the beveled edges of the plate snugly engaging the wall surface 7.

Flush plates vary in thickness according to the material from which the plates are made, and if the plates are formed of a material such as bakelite, the switches and receptacles being mounted must properly align with the wall surface to prevent possible breaking of the plate when attached by the screws 34.

In mounting the box A in a finished wall, it will not be necessary to exactly align the outer edge of the box with the face of the wall for proper mounting of a flush switch or receptacle in the box. The box is preferably set with the outer edge set inwardly a short distance from the wall surface and then the adjustable supports 15 adjusted for properly disposing the mounting lugs 17.

In concrete construction work, the outlet boxes are usually nailed to the inside of the concrete forms and when the forms are removed, the open side of the box is disposed flush with the wall surface. With the conventional types of outlet boxes now in use provided with the fixed mounting lugs, the lugs are set a considerable distance beneath the surface of a finishing wall coating subsequently applied to the concrete wall. This requires that the electrician do considerable building up as with washers or other expedients for bringing the switch or receptacle flush with the finished wall surface and resulting in a great loss of time and expense. With the adjustable mounting lugs of the improved outlet box A, it will be seen that the switches or receptacles may be easily mounted in proper relation to the finished wall surface thru merely adjusting the supports 15.

Thus it will be seen that an improved type of outlet box has been provided for proper mounting of flush switches and receptacles with respect to a wall surface regardless of the fact that the box has been mounted with its open end set inwardly from the wall surface. It will also be apparent that the improved outlet box provided with the adjustable supports will permit ready mounting of the conventional types of flush switches and receptacles.

Changes in detail may be made to the form of invention herein shown and described, without departing from the spirit of the invention or the scope of the following claims.

I claim:

1. In an outlet box for flush switches, a support embodying a pair of parallel spaced apart arms and an angularly offset switch mounting lug connecting the outer ends of the arms, a guide lug projecting inwardly from one wall of the box adjacent the open end thereof for extending between said arms, and a set screw threaded into the wall of the box in a direct alignment inwardly of said lug and extending between the arms, said set screw having its head engageable with the arms for locking the support in any longitudinally adjusted position.

2. In an outlet box for flush switches, an end wall having a guide lug bent inwarly adjacent the outer edge of the wall, an L-shaped support including a U-shaped body portion and a switch mounting lug, said U-shaped body portion providing a pair of parallel side arms for movement at opposite sides of said guide lug, and a set screw threaded into the end wall in direct alignment inwardly of said lug and having its head portion adapted for clamping engagement with said arms.

3. An outlet box including end walls, a lug bent inwardly from each end wall adjacent the open side of the box, a switch support adjustably guided on each lug, and a set screw threaded into each end wall for retaining the supports in any longitudinally adjusted positions and against lateral movement.

4. In an outlet box for flush switches, parallel end walls each having a recessed outer edge, a lug bent inwardly of each end wall at the bottoms of the recesses, an adjustable support carried by each end wall each including a guide portion overlying the inner surfaces of the end wall and an outturned switch mounting lug for movement into the recesses, said supports being guided by said lugs, and a set screw in each end wall for clamping engagement with the guide portions of the supports for retaining the switch mounting lugs in adjusted positions relative to the open side of the box.

5. In an outlet box, a pair of parallel end walls each having a recess provided at its outer edge, an L-shaped switch support carried by each end wall each embodying a body portion disposed over the inner side of the end wall and an outturned switch mounting lug adapted to be seated in the recesses flush with the open side of the box, and guide means for each support embodying means for retaining the supports in any longitudinally adjusted position.

6. In an outlet box for flush switches, end walls each having an inwardly bent lug adjacent its forward edge, a switch support guided on each lug at the inner side of the walls, and a set screw threaded into each end wall in direct alignment inwardly of the lugs for retaining the supports in adjusted positions, said set screws having their axes converging to a point at the open side of the box.

7. In an outlet box for flush switches, end walls each having an inwardly bent lug adjacent its outer edge, an adjustable switch support for each end wall each being provided with a longitudinally extending guide way into which said lugs project, and a set screw threaded into each end wall in direct alignment inwardly of the lugs, said set screws to extend thru the guide ways of the supports for permitting only longitudinal sliding movement of the supports and clamping of the supports in longitudinally adjusted positions.

8. In an outlet box for flush switches etc., an open sided box including parallel end walls, a guide lug bent inwardly from each end wall adjacent the open side of the box, a support for each end wall each including a U-shaped body portion slidable over the inner surface of the end wall and an outturned switch mounting lug, said U-shaped body portions forming guide ways for receiving said guide lugs, and a set screw threaded into each end wall and extending thru the guide ways of the supports in direct alignment inwardly of the guide lugs for clamping the supports in any longitudinally adjusted position.

9. In an outlet box for flush switches, end walls having a recessed outer edge, a pair of L-shaped switch supports guided in a straight path of movement into and out of the open side of the box upon the walls and to a position in the recesses flush with the open side of the box, and means for retaining the supports in any longitudinally adjusted position.

WILLARD L. PHIFFER.